United States Patent
Tanaka

(10) Patent No.: US 11,460,211 B2
(45) Date of Patent: Oct. 4, 2022

(54) AIR-CONDITIONING APPARATUS COFIGURED TO CONTROL ROTATION FREQUENCY OF FAN

(71) Applicant: Mitsubishi Electric Corporation, Tokyo (JP)

(72) Inventor: Hideyasu Tanaka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 37 days.

(21) Appl. No.: 17/262,257

(22) PCT Filed: Sep. 27, 2018

(86) PCT No.: PCT/JP2018/036012
§ 371 (c)(1),
(2) Date: Jan. 22, 2021

(87) PCT Pub. No.: WO2020/065844
PCT Pub. Date: Apr. 2, 2020

(65) Prior Publication Data
US 2021/0285679 A1    Sep. 16, 2021

(51) Int. Cl.
*F24F 11/77* (2018.01)
*F24F 11/64* (2018.01)
(Continued)

(52) U.S. Cl.
CPC ............ *F24F 11/77* (2018.01); *F24F 11/64* (2018.01); *F24F 2110/10* (2018.01); *F24F 2110/40* (2018.01)

(58) Field of Classification Search
None
See application file for complete search history.

(56) References Cited

U.S. PATENT DOCUMENTS 9,644,856 B1* 5/2017 Francis ............... F24F 11/30
2014/0213171 A1* 7/2014 Sugimoto ............ F24F 11/77
                                                       454/256
(Continued)

FOREIGN PATENT DOCUMENTS

JP    3304362 B2    11/1992
JP    H05-118629 A    5/1993

OTHER PUBLICATIONS

International Search Report of the International Searching Authority dated Dec. 18, 2018 for the corresponding International application No. PCT/JP2018/036012 (and English translation).

*Primary Examiner* — Nathan L Laughlin
(74) *Attorney, Agent, or Firm* — Posz Law Group, PLC

(57) ABSTRACT

An air-conditioning apparatus includes a fan to send air to an air-conditioned space through a duct, a current measurement unit to measure a value of a current applied to a motor as a motor current, an inlet temperature measurement unit to measure a temperature of air flowing into the duct as an inlet temperature, and a controller to control the fan. The controller includes a memory storing current characteristic data associating the motor current and a rotation frequency of the motor with an external static pressure. The controller performs a correction process based on the inlet temperature to the motor current to obtain a control current, estimate the external static pressure by comparing the obtained control current and the rotation frequency of the motor with the current characteristic data, and control a rotation frequency of the fan, on the basis of the estimated external static pressure.

7 Claims, 5 Drawing Sheets

(51) Int. Cl.
   *F24F 110/40*     (2018.01)
   *F24F 110/10*     (2018.01)

(56)             References Cited

U.S. PATENT DOCUMENTS

2015/0147953 A1*  5/2015  Park .................... F24F 11/0001
                                                          454/256
2016/0215996 A1*  7/2016  Blair .................... G08B 21/187
2019/0236446 A1*  8/2019  Qin ......................... G06N 3/04

* cited by examiner

FIG. 3

| INLET TEMPERATURE T | CORRECTION COEFFICIENT $\alpha$ |
|---|---|
| HIGHER THAN UPPER LIMIT TEMPERATURE (DIFFERENCE FROM UPPER LIMIT TEMPERATURE IS INCREASED) | $\alpha > 1$ (CORRECTION COEFFICIENT $\alpha$ IS INCREASED) |
| REFERENCE TEMPERATURE RANGE (UPPER LIMIT TEMPERATURE TO LOWER LIMIT TEMPERATURE) | $\alpha = 1$ |
| LOWER THAN LOWER LIMIT TEMPERATURE (DIFFERENCE FROM LOWER LIMIT TEMPERATURE IS INCREASED) | $\alpha < 1$ (CORRECTION COEFFICIENT $\alpha$ IS REDUCED) |

FIG. 4

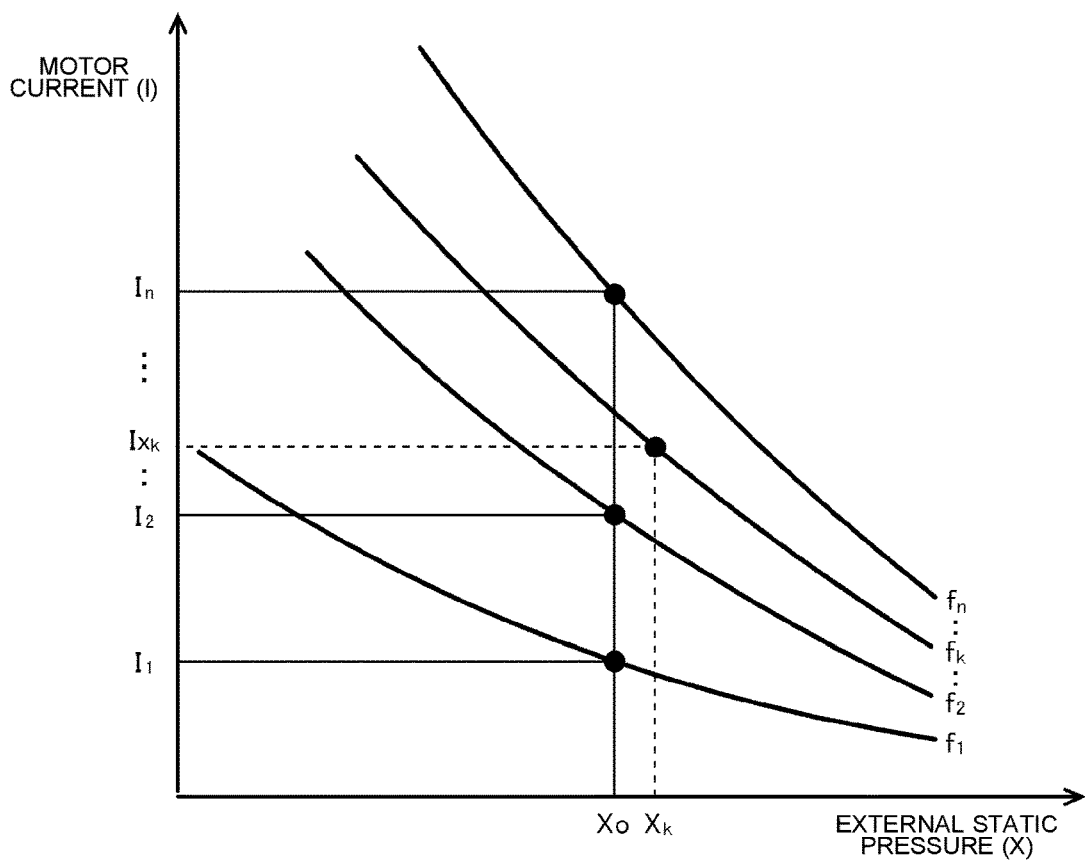

$X_0 \cdots$ EXTERNAL STATIC PRESSURE AT STANDARD POINT (STANDARD EXTERNAL STATIC PRESSURE)

$I_1$ TO $I_n \cdots$ CURRENTS UNDER STANDARD EXTERNAL STATIC PRESSURE $X_0$ AT RESPECTIVE ROTATION FREQUENCIES $P_0$ ⋯ INTERNAL STATIC PRESSURE AT STANDARD POINT
$P_1$ ⋯ STATIC PRESSURE AT STANDARD POINT
$Q$ ⋯ SPECIFICATION AIR VOLUME UNIQUE TO AIR-CONDITIONING APPARATUS
(EXTERNAL STATIC PRESSURE AT STANDARD POINT IS OBTAINED BY $X_0 = P_1 - P_0$)

AIR-CONDITIONING APPARATUS COFIGURED TO CONTROL ROTATION FREQUENCY OF FAN

CROSS REFERENCE TO RELATED APPLICATION

This application is a U.S. national stage application of International Application No. PCT/JP2018/036012, filed on Sep. 27, 2018, the contents of which are incorporated herein by reference.

TECHNICAL FIELD

The present disclosure relates to an air-conditioning apparatus provided with a fan configured to send air to an air-conditioned space through a duct.

BACKGROUND

Some air-conditioning apparatus controls a fan, on the basis of a motor current that is a current input to a motor of the fan (see, for example Patent Literature 1). An air-conditioning apparatus of Patent Literature 1 estimates the external static pressure by comparing a measured motor current and the rotation frequency of a motor with current characteristic data, controls the rotation frequency of a fan on the basis of the estimated external static pressure, and adjusts the air volume to the air-conditioned space.

Patent Literature

Patent Literature 1: Japanese Unexamined Patent Application Publication No. 5-118629

However, the length of a duct varies depending on where an air-conditioning apparatus is installed, so that the airflow resistance downstream of a fan varies. Such variations in installation environment affect the measurement value of the motor current. That is, in the case of the configuration of Patent Literature 1, there is a difference between a reference motor current in the current characteristic data and the measured motor current, so that the accuracy in estimating the external static pressure is reduced. Therefore, when the external static pressure changes, the rotation frequency of the fan cannot be accurately controlled.

SUMMARY

The present disclosure has been made to solve the above problem, and an object of the present disclosure is to provide an air-conditioning apparatus that accurately controls the rotation frequency of a fan even when the external static pressure changes.

An air-conditioning apparatus according to an embodiment of the present disclosure includes a fan including a motor and configured to send air to an air-conditioned space through a duct, a current measurement unit configured to measure a value of a current applied to the motor as a motor current, an inlet temperature measurement unit configured to measure a temperature of air flowing into the duct as an inlet temperature, and a controller configured to control the fan. The controller includes a memory storing current characteristic data associating the motor current and a rotation frequency of the motor with an external static pressure, a correction processing unit configured to perform a correction process based on the inlet temperature to the motor current to obtain a control current, an external static pressure estimation unit configured to estimate the external static pressure, by comparing the control current obtained by the correction processing unit and the rotation frequency of the motor with the current characteristic data, and an operation control unit configured to control a rotation frequency of the fan, on the basis of the external static pressure estimated by the external static pressure estimation unit.

According to an embodiment of the present disclosure, a correction process based on the inlet temperature, which changes as the external static pressure changes, is performed to the motor current, so that it is possible to accurately estimate the present external static pressure, using the corrected control current. Therefore, the rotation frequency of the fan can be accurately adjusted even when the external static pressure changes.

BRIEF DESCRIPTION OF DRAWINGS

FIG. 3 is an explanatory table illustrating an example of the structure of coefficient data stored in a memory of FIG. 2.

FIG. 4 is a current characteristic diagram associating the motor current and the rotation frequency of a motor with an external static pressure.

DETAILED DESCRIPTION

Embodiment

Figure 1:
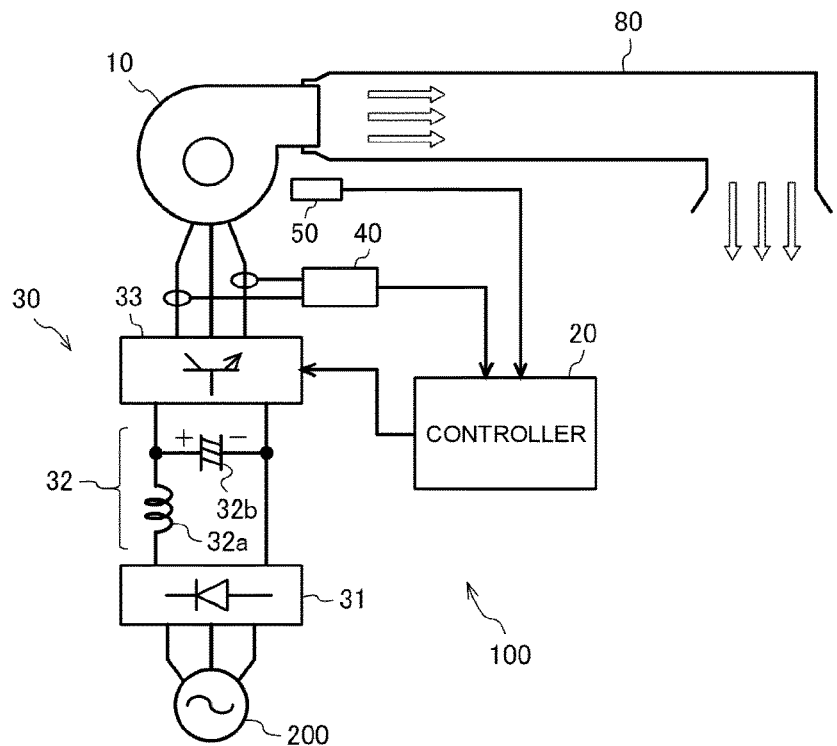
FIG. 1 is a configuration diagram schematically illustrating the configuration of an air-conditioning apparatus according to Embodiment of the present disclosure.
Figure 2:
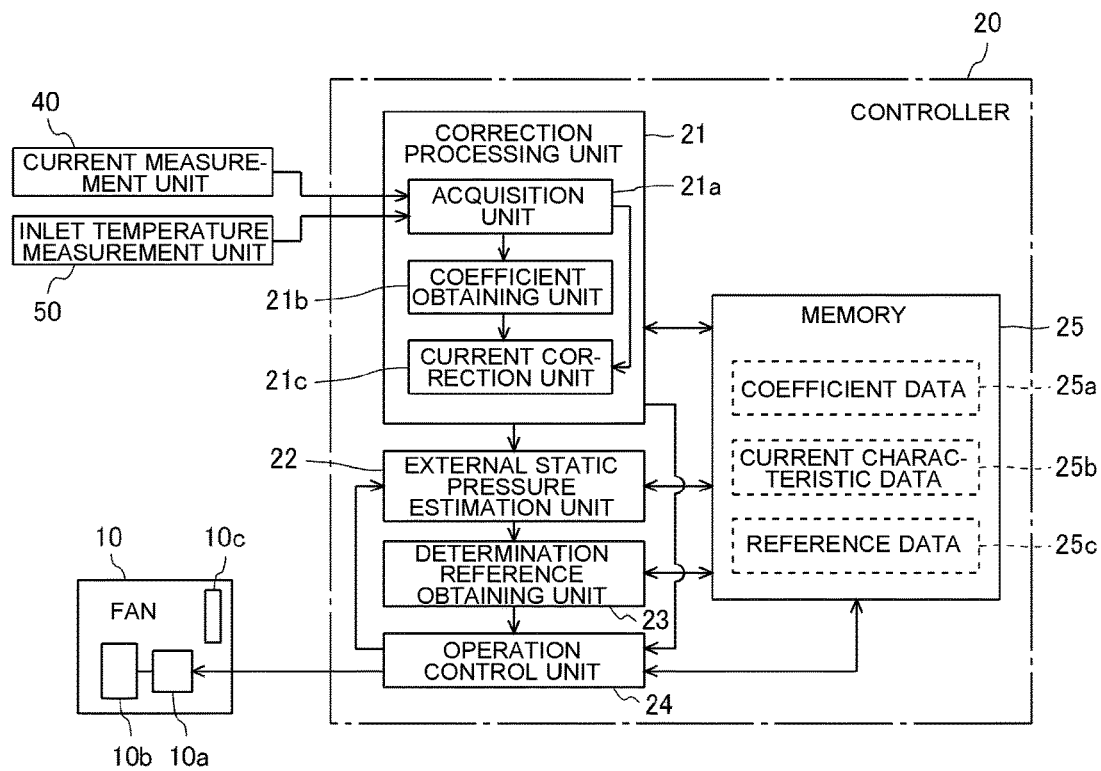
FIG. 2 is a block diagram illustrating the functional configuration of a controller of FIG. 1.

FIG. 1 is a configuration diagram schematically illustrating the configuration of an air-conditioning apparatus according to Embodiment of the present disclosure. FIG. 2 is a block diagram illustrating the functional configuration of a controller of FIG. 1. FIG. 3 is an explanatory table illustrating an example of the structure of coefficient data stored in a memory of FIG. 2. FIG. 4 is a current characteristic diagram associating the motor current and the rotation frequency of a motor with an external static pressure. The external static pressure is a static pressure of the air at the exit of an apparatus, such as an air-conditioning apparatus, including a fan. In Embodiment, "external" means the outside of an air-conditioning apparatus 100. FIG. 1 illustrates the configuration of the air-conditioning apparatus 100, particularly the configuration of a system of an inverter device using a capacitor input rectifier circuit. The configuration of the air-conditioning apparatus 100 and its peripheral configuration will be described with reference to FIGS. 1 to 4.

As illustrated in FIG. 1, the air-conditioning apparatus 100 includes a fan 10, a controller 20, a power conversion device 30, a current measurement unit 40, and an inlet temperature measurement unit 50.

Examples of the fan 10 include a sirocco fan, and the fan 10 is configured to send air to an air-conditioned space, such as a room, through an air duct 80. In FIG. 1, the white arrows illustrated inside the air duct 80 and other areas indicate the flow of air from the fan 10. As illustrated in FIG. 2, the fan 10 includes a motor 10a driven by an inverter, and an impeller 10b configured to be rotated by the motor 10a used as a power source and send air into the air duct 80. The fan 10 further includes a filter 10c disposed at an air inlet to remove dust and other substances in the air to be suctioned into a housing of the fan 10.

The power conversion device 30 is configured to drive the motor 10a of the fan 10, with an AC voltage input from an AC power supply 200, in accordance with a control command from the controller 20. The power conversion device 30 includes a rectification device 31, a smoothing circuit 32, and an inverter device 33.

Examples of the rectification device 31 include a three-phase rectifier, and the rectification device 31 is configured to rectify the AC voltage from the AC power supply 200. The smoothing circuit 32 includes a reactor 32a and a smoothing capacitor 32b. The reactor 32a is configured to reduce a ripple current flowing into the smoothing capacitor 32b. The smoothing capacitor 32b is configured to smooth a DC voltage output from the reactor 32a. The inverter device 33 includes a switching element such as an insulated gate bipolar transistor (IGBT) and other semiconductor, and is configured to control the rotation frequency of the fan 10.

The current measurement unit 40 is a current sensor configured to measure the value of the current applied to the motor 10a as a motor current I, and output the measured motor current I to the controller 20. The motor current I is a current detected in the secondary current from the inverter device 33. The inlet temperature measurement unit 50 is a temperature sensor, such as a thermistor, configured to measure the temperature of the air flowing into the air duct 80 as an inlet temperature T. Then, the inlet temperature measurement unit 50 outputs the measured inlet temperature T to the controller 20.

The controller 20 monitors the current measurement unit 40 and the inlet temperature measurement unit 50, and controls the fan 10 on the basis of the motor current I and the inlet temperature T. That is, the controller 20 outputs a control command showing the rotation frequency of the motor 10a to the inverter device 33, and controls the operation of the switching element of the inverter device 33, thereby controlling the rotation frequency of the motor 10a via the inverter device 33. The rotation frequency of the motor 10a is hereinafter referred to also as a "rotation frequency f".

That is, the AC voltage input from the AC power supply 200 is rectified by the rectification device 31 and smoothed by the smoothing circuit 32 to be converted into a DC voltage. The DC voltage obtained through the conversion process by the rectification device 31 and the smoothing circuit 32 is converted back by the inverter device 33 to AC voltage of a frequency corresponding to a control command from the controller 20. That is, the controller 20 controls the rotation frequency of the fan 10, via the inverter device 33.

As illustrated in FIG. 2, the controller 20 includes a correction processing unit 21, an external static pressure estimation unit 22, a determination reference obtaining unit 23, an operation control unit 24, and a memory 25. The memory 25 stores coefficient data 25a associating the inlet temperature T with a correction coefficient α. The memory 25 further stores current characteristic data 25b associating the motor current I and the rotation frequency f with an external static pressure X. The memory 25 further stores reference data 25c associating the external static pressure X with a determination reference used to determine whether to adjust the rotation frequency f.

The correction processing unit 21 performs a correction process based on the inlet temperature T to the motor current I, thereby obtaining a control current Ix to be used for controlling the fan 10. The correction processing unit 21 includes an acquisition unit 21a, a coefficient obtaining unit 21b, and a current correction unit 21c. The acquisition unit 21a acquires the inlet temperature T from the inlet temperature measurement unit 50, and passes the acquired inlet temperature T to the coefficient obtaining unit 21b. Further, the acquisition unit 21a acquires the motor current I from the current measurement unit 40, and passes the acquired motor current I to the current correction unit 21c.

The coefficient obtaining unit 21b obtains the correction coefficient α by comparing the inlet temperature T acquired from the acquisition unit 21a with the coefficient data 25a, and outputs the obtained correction coefficient α to the current correction unit 21c. The coefficient data 25a in Embodiment has a structure illustrated in FIG. 3. Specifically, in the coefficient data 25a, a reference temperature range that is a temperature range from an upper limit temperature to a lower limit temperature is set. The reference temperature range, that is, the upper limit temperature and the lower limit temperature are set in advance and stored in the memory 25. The upper limit temperature and the lower limit temperature can be changed appropriately to the installation environment and the outside air temperature.

The correction coefficient α for the reference temperature range is set to "1". The inlet temperature T lower than the lower limit temperature is associated with a correction coefficient α less than 1. This is because when the inlet temperature T decreases, the motor winding resistance decreases, so that the motor current I increases, and therefore the actual measurement value of the motor current I needs to be corrected to be smaller. The inlet temperature T higher than the upper limit temperature is associated with a correction coefficient α greater than 1. This is because when the inlet temperature T increases, the motor winding resistance increases, so that the motor current I decreases, and therefore the actual measurement value of the motor current I needs to be corrected to be greater. Note that the external static pressure X decreases as the airflow resistance decreases, and the external static pressure X increases as the airflow resistance increases.

Further, the coefficient data 25a is set such that the correction coefficient α increases as the difference between the inlet temperature T and the upper limit temperature increases. This is because the motor current I needs to be corrected to a greater extent as the inlet temperature T increases. Also, the coefficient data 25a is set such that the correction coefficient α decreases as the difference between the inlet temperature T and the lower limit temperature increases. This is because the motor current I needs to be corrected to a greater extent as the inlet temperature T decreases.

The current correction unit 21c calculates the control current Ix, on the basis of the motor current I acquired from the acquisition unit 21a and the correction coefficient α obtained by the coefficient obtaining unit 21b, using the following formula (1). That is, the current correction unit 21c calculates the control current Ix by multiplying the motor current I by the correction coefficient α.

[Formula 1]

$$Ix = \alpha \times I \quad (1)$$

The external static pressure estimation unit 22 estimates the external static pressure X at that point of time, on the basis of the rotation frequency f, and the control current Ix calculated using the correction coefficient α based on the inlet temperature T. That is, the external static pressure estimation unit 22 estimates the present external static pressure X, by comparing the control current Ix obtained by the correction processing unit 21 and the rotation frequency f with the current characteristic data 25b. The external static pressure estimation unit 22 is configured to obtain the rotation frequency f, from the control command showing the rotation frequency f output from the operation control unit 24 to the inverter device 33.

The current characteristic data 25b in Embodiment has a structure illustrated in FIG. 4. That is, the current characteristic data 25b is represented by curves respectively corresponding to a plurality of rotation frequencies $f_1$ to $f_n$ (n is an arbitrary natural number) of the motor 10a in a coordinate system in which the horizontal axis represents the external static pressure X, and the vertical axis represents the motor current I.

In FIG. 4, a standard external static pressure Xo is the external static pressure X at a standard point, that is, the external static pressure X corresponding to the rated air volume specified for the air-conditioning apparatus 100. Further, $I_1$ is the motor current I corresponding to the standard external static pressure Xo and the rotation frequency $f_1$, $I_2$ is the motor current I corresponding to the standard external static pressure Xo and the rotation frequency $f_2$, and $I_n$ is the motor current I corresponding to the standard external static pressure Xo and the rotation frequency $f_n$.

The external static pressure estimation unit 22 obtains the external static pressure X corresponding to the intersection of a line corresponding to the control current Ix and a curve corresponding to the present rotation frequency f. For example, as illustrated in FIG. 4, when the present control current Ix is "$Ix_k$" and the rotation frequency f is "$f_k$", the external static pressure estimation unit 22 obtains "$X_k$" as the external static pressure X.

The motor current I changes when the length or the shape of the air duct 80 is changed. Further, the motor current I also changes when a part disposed inside the air duct 80 is changed, when the arrangement is changed, or when a part is added. Therefore, if the actual measurement value of the motor current I is directly compared with the current characteristic data as in the related art, the external static pressure X cannot be accurately calculated. In this regard, the air-conditioning apparatus 100 of Embodiment is configured to obtain the control current Ix by performing a correction process based on the inlet temperature T to the motor current I, and obtain the external static pressure X by comparing the obtained control current Ix with the current characteristic data. Therefore, it is possible to obtain a more reliable estimated value of the external static pressure X. Note that examples of parts disposed in the air duct 80 include a high efficiency particulate air filter (HEPA filter).

The determination reference obtaining unit 23 obtains a determination reference by comparing the external static pressure X estimated by the external static pressure estimation unit 22 with the reference data 25c. The reference data 25c in Embodiment includes a plurality of external static pressure ranges each representing a range of the external static pressure X, and determination references respectively associated with the plurality of external static pressure ranges. Each determination reference is a range of the current value that is set in association with the control current Ix. That is, the reference data 25c is table information associating the external static pressure ranges with the respective determination references.

Each determination reference is set to a range from a lower limit value to an upper limit value. For example, in the case of a determination reference set to a range greater than or equal to 10 [A] and less than or equal to 11 [A], the lower limit value is 10 [A] and the upper limit value is 11 [A].

The operation control unit 24 controls the rotation frequency of the fan 10 on the basis of the external static pressure X estimated by the external static pressure estimation unit 22. That is, the operation control unit 24 controls the rotation frequency of the fan 10 on the basis of the relationship between the determination reference obtained by the determination reference obtaining unit 23 and the control current Ix obtained by the correction processing unit 21.

More specifically, if the control current Ix is less than the lower limit value of the determination reference, the operation control unit 24 increases the rotation frequency f by a lower limit set amount. Meanwhile, if the control current Ix is greater than the upper limit value of the determination reference, the operation control unit 24 reduces the rotation frequency f by an upper limit set amount. The lower limit set amount and the upper limit set amount are set in advance and stored in the memory 25, and can be appropriately changed. Note that the lower limit set amount and the upper limit set amount may be set to the same amount, or may be set to different amounts.

The controller 20 may include an arithmetic device such as a microcomputer, and software that works with such an arithmetic device to implement the functions described above and below. The memory 25 may be a random access memory (RAM), a read only memory (ROM), a programmable ROM (PROM) such as a flash memory, or a hard disk drive (HDD).

Figure 5:
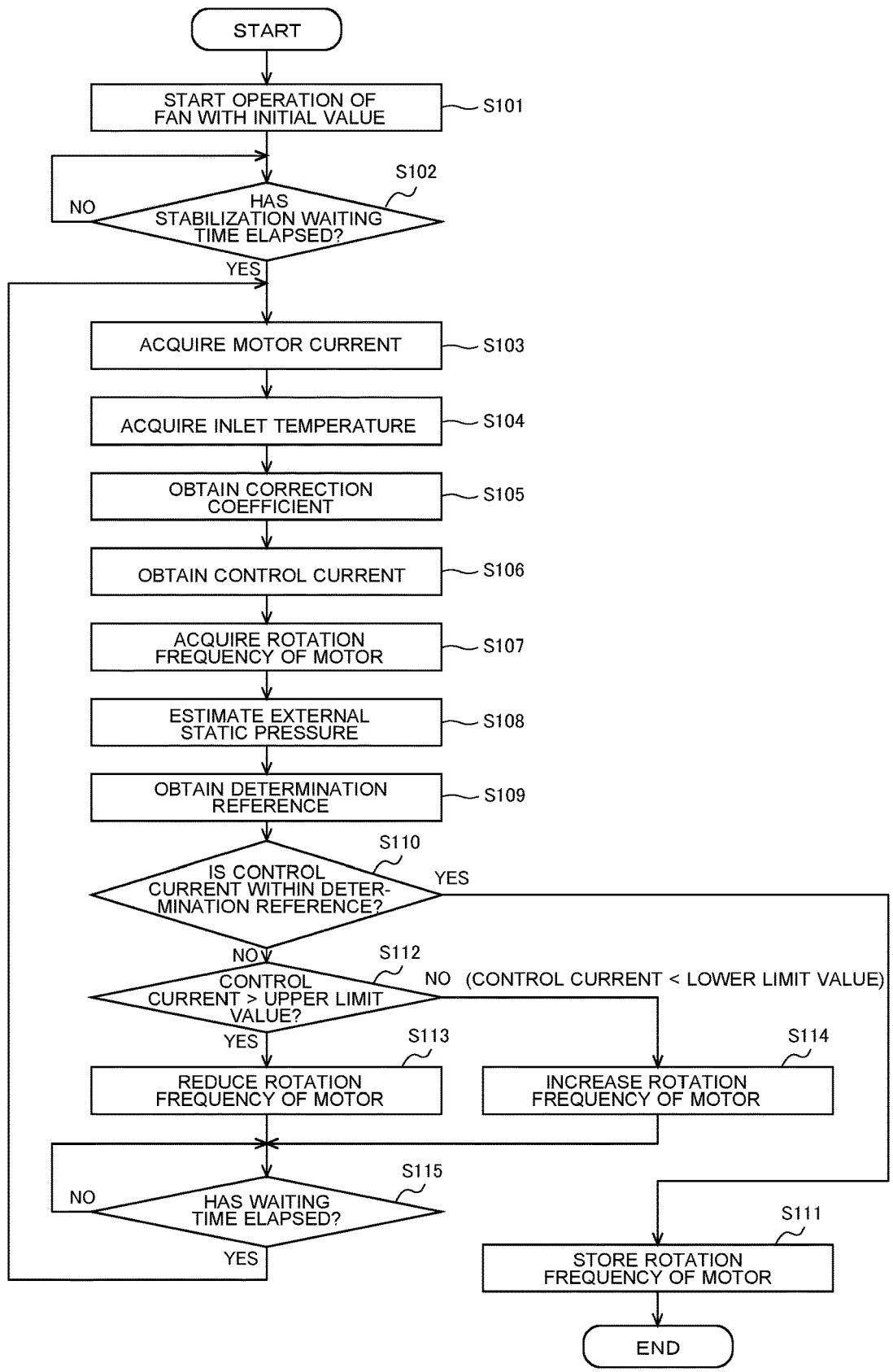
FIG. 5 is a flowchart illustrating an initial operation after installation of the air-conditioning apparatus of FIG. 1 on site.

FIG. 5 is a flowchart illustrating an initial operation after installation of the air-conditioning apparatus of FIG. 1 on site. An adjustment process of the rotation frequency f performed by the controller 20 in the initial operation upon the installation on site will be described with reference to FIG. 5. In the following description, the determination reference is defined as a range from a lower limit value to an upper limit value.

When the air-conditioning apparatus 100 is started, the operation control unit 24 starts the operation of the fan 10, with an initial value. The initial value is a preset initial rotation frequency f of the motor 10a. That is, the operation control unit 24 outputs a control command showing the initial value to the inverter device 33, thereby rotating the motor 10a with the initial value (step S101).

Subsequently, the correction processing unit 21 waits until a stabilization waiting time elapses from when the operation of the fan 10 with the initial value is started. The stabilization waiting time is the time set for stabilizing the rotation frequency of the fan 10. The stabilization waiting time is set to, for example, 1 minute, and is appropriately changed depending on the configuration and the installation environment of the air-conditioning apparatus 100 (NO in step S102).

When the stabilization waiting time has elapsed (YES in step S102), the correction processing unit 21 acquires the motor current I from the current measurement unit 40 (step S103). Further, the correction processing unit 21 acquires the inlet temperature T from the inlet temperature measurement unit 50 (step S104). Then, the correction processing unit 21 obtains the correction coefficient α by comparing the acquired inlet temperature T with the coefficient data 25a (step S105).

Subsequently, the correction processing unit 21 multiplies the acquired motor current I by the obtained correction coefficient α, thereby calculating the control current Ix to be used for controlling the fan 10. Then, the correction processing unit 21 outputs the obtained control current Ix to the external static pressure estimation unit 22 and the operation control unit 24 (step S106).

Further, the external static pressure estimation unit 22 acquires the rotation frequency f from the control command from the operation control unit 24 to the inverter device 33 (step S107). Then, the external static pressure estimation unit 22 estimates the present external static pressure X, by comparing the acquired rotation frequency f and the control current Ix input from the correction processing unit 21 with the current characteristic data 25b. Then, the external static pressure estimation unit 22 outputs the external static pressure X obtained through the estimation process to the determination reference obtaining unit 23 (step S108).

The determination reference obtaining unit 23 obtains a determination reference by comparing the external static pressure X estimated by the external static pressure estimation unit 22 with the reference data 25c, and outputs the obtained determination reference to the operation control unit 24 (step S109).

Subsequently, the operation control unit 24 compares the control current Ix input from the correction processing unit 21 with the determination reference input from the determination reference obtaining unit 23, and determines whether the control current Ix is within the determination reference (step S110).

If the control current Ix is within the determination reference (YES in step S110), the operation control unit 24 stores the rotation frequency f at the present point of time in the memory 25. Note that if the initially obtained control current Ix is within the determination reference, the controller 20 stores the initial value in the memory 25 as the rotation frequency f in the adjustment process at this time (step S111).

Meanwhile, when the control current Ix is outside the determination reference (NO in step S110), if the control current Ix is greater than the upper limit value (YES in step S112), the operation control unit 24 reduces the rotation frequency f by the upper limit set amount (step S113). Further, when the control current Ix is outside the determination reference (NO in step S110), if the control current Ix is less than the lower limit value (NO in step S112), the operation control unit 24 increases the rotation frequency f by the lower limit set amount (step S114).

Upon changing the rotation frequency f (steps S113 and S114), the operation control unit 24 outputs a change notification reporting that the rotation frequency f is changed to the correction processing unit 21. Upon receiving the change notification from the operation control unit 24, the correction processing unit 21 starts measurement of time, and waits until the waiting time elapses. The waiting time is set to, for example, 1 minute, and can be appropriately changed depending on the configuration and the installation environment of the air-conditioning apparatus 100 (NO in step S115).

When the waiting time has elapsed (YES in step S115), the process returns to step S103. That is, the controller 20 executes a series of operations in steps S103 to S110. In this series of operations, if the control current Ix is within the determination reference (YES in step S110), the controller 20 stores the rotation frequency f at that point of time in the memory 25. Meanwhile, in this series of operations, if the control current Ix is outside the determination reference (NO in step S110), the controller 20 executes the operations in steps S112 to S114 as appropriate. Then, when the waiting time has elapsed after the rotation frequency f is changed (YES in step S115), the process returns again to step S103. Then, the controller 20 repeatedly executes the above operations until the control current Ix is within the determination reference. In this manner, as the operations in steps S103 to S115 are repeatedly executed as appropriate, the volume of air to be sent to the air-conditioned space, that is, the air volume can be maintained constant.

Figure 6:
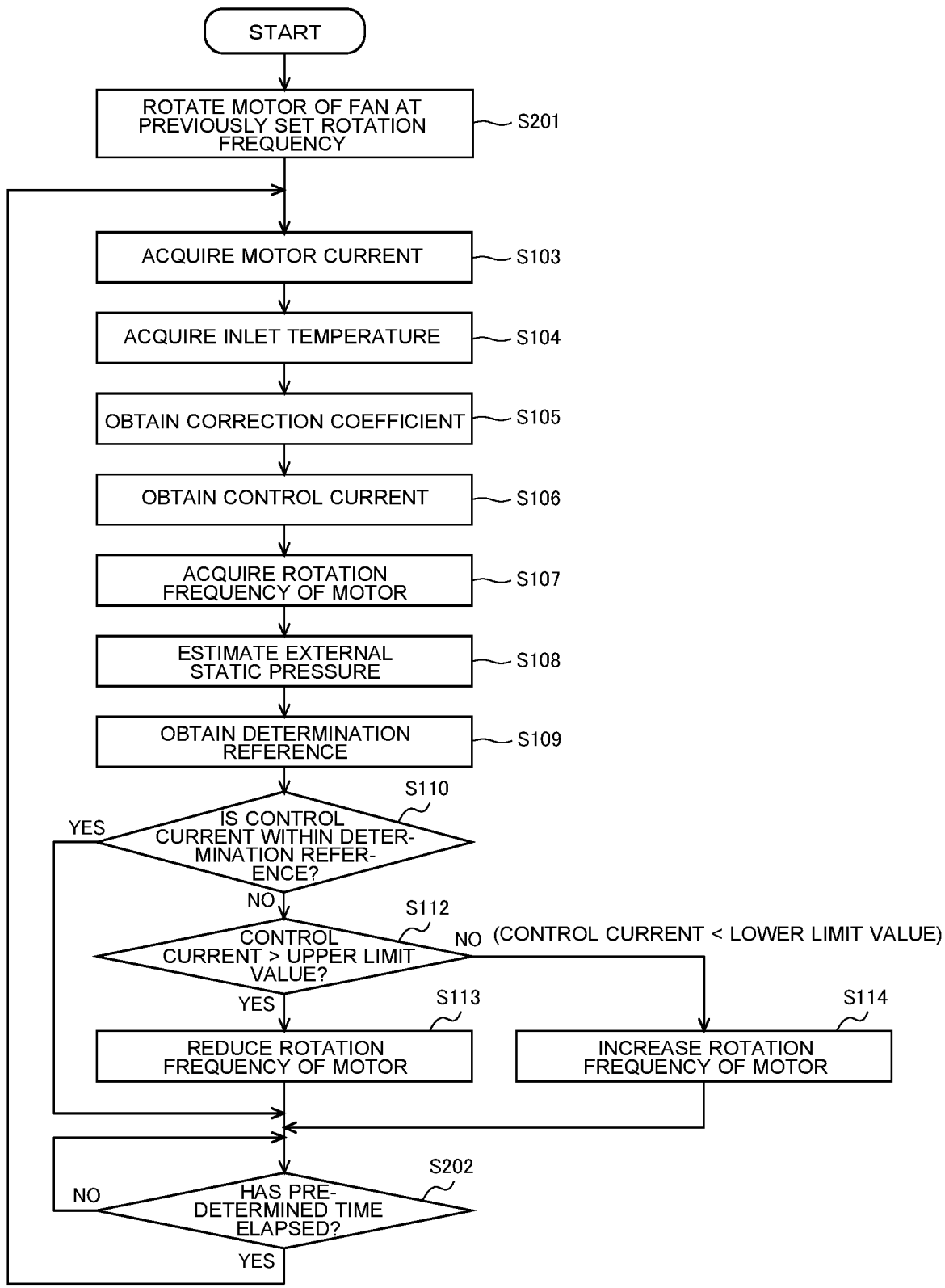
FIG. 6 is a flowchart illustrating an exemplary operation of a constant adjustment process of the rotation frequency of the motor by the air-conditioning apparatus of FIG. 1.

FIG. 6 is a flowchart illustrating an exemplary operation of a constant adjustment process of the rotation frequency of the motor by the air-conditioning apparatus of FIG. 1. The air-conditioning apparatus 100 performs an adjustment process of the rotation frequency f at regular time intervals, or in response to an instruction from the user. The time interval is set to, for example, 1 minute, and can be appropriately changed. The air-conditioning apparatus 100 can receive an instruction for executing the adjustment process of the rotation frequency f, in response to an operation by the user via a device such as a dedicated remote controller and a centralized controller. In the following description, the air-conditioning apparatus 100 is defined to perform the adjustment process of the rotation frequency f at regular time intervals. The same steps as those in FIG. 5 are denoted by the same reference signs, and will not be described below.

First, the operation control unit 24 rotates the motor 10a of the fan 10, at the previously set rotation frequency f. The previously set rotation frequency f is the rotation frequency f stored in the memory 25 in the initial operation, or the rotation frequency f stored in the memory 25 in the previous adjustment process of the rotation frequency f (step S201).

Subsequently, the controller 20 executes a series of operations in steps S103 to S109 as in the case of FIG. 5. Then, if the control current Ix is within the determination reference (YES in step S110), the controller 20 waits until a predetermined time elapses (NO in step S202). When the predetermined time has elapsed (YES in step S202), the process returns to step S103. Meanwhile, if the control current Ix is outside the determination reference (NO in step S110), the controller 20 executes the operations in steps S112 to S114 as appropriate. When the predetermined time has elapsed after the rotation frequency f is changed (YES in step S202), the process returns to step S103.

That is, the controller 20 executes a series of operations in steps S103 to S110 every time the process returns to step S103 via step S202. In this series of operations, if the control current Ix is outside the determination reference (NO in step S110), the controller 20 executes the operations in steps S112 to S114 as appropriate. Then, when the predetermined time has elapsed after the rotation frequency f is changed (YES in step S202), the process returns again to step S103. Meanwhile, in this series of operations, if the control current Ix is within the determination reference (YES in step S110), the process returns again to step S103 after lapse of the predetermined time (YES in step S202). In this manner, as the operations in steps S103 to S114 and S202 are repeatedly executed as appropriate, the volume of air to be sent to the air-conditioned space can be maintained constant.

In FIGS. 5 and 6, the controller 20 acquires the motor current I from the current measurement unit 40 only once, during the waiting time (FIG. 5) or during the predetermined time (FIG. 6). However, the operation is not limited to this example. For example, the controller 20 may acquire the motor current I from the current measurement unit 40 a plurality of number of times, and obtain the control current Ix by correcting an average motor current Ia representing the average value of a plurality of motor currents I.

In this case, for example, the correction processing unit 21 preferably acquires a plurality of motor currents I at regular intervals, and obtains the average motor current Ia, which is the average value of the acquired plurality of motor currents I. Then, the correction processing unit 21 preferably calculates the control current Ix, on the basis of the average motor current Ia and the correction coefficient α, using the following formula (2). That is, the correction processing unit 21 preferably calculates the control current Ix by multiplying the average motor current Ia by the correction coefficient α. In this case, the correction process to the motor current I includes a step of obtaining the average motor current Ia, which is the average value of a plurality of motor currents I, and a step of correcting the average motor current Ia by multiplying the average motor current Ia by the correction coefficient α.

[Formula 2]

$$Ix = \alpha \times Ia \qquad (2)$$

In this manner, the measurement error of the motor current I due to variation in current value and the measurement timing can be reduced, so that the accuracy in estimating the external static pressure X is increased. Therefore, it is possible to more accurately perform the adjustment process of the rotation frequency f. Accordingly, it is possible to stably send a set volume of air to an air-conditioned space, through the air duct 80.

If the control current Ix is less than the lower limit value of the determination reference, the operation control unit 24 may obtain a lower limit difference representing the difference between the control current Ix and the lower limit set amount, and increase the rotation frequency of the motor 10a depending on the magnitude of the obtained lower limit difference. Meanwhile, if the control current Ix is greater than the upper limit value of the determination reference, the operation control unit 24 may obtain an upper limit difference representing the difference between the control current Ix and the upper limit set amount, and reduce the rotation frequency of the motor 10a depending on the magnitude of the obtained upper limit difference.

Specifically, for example, an increase amount table associating the lower limit difference with the amount of the rotation frequency f to be increased and a reduction amount table associating the upper limit difference with the amount of the rotation frequency f to be reduced is preferably stored in the memory 25. The increase amount table is preferably compiled such that the amount of the rotation frequency f to be increased increases as the lower limit difference increases. The reduction amount table is preferably compiled such that the amount of the rotation frequency f to be reduced increases as the upper limit difference increases.

Figure 7:
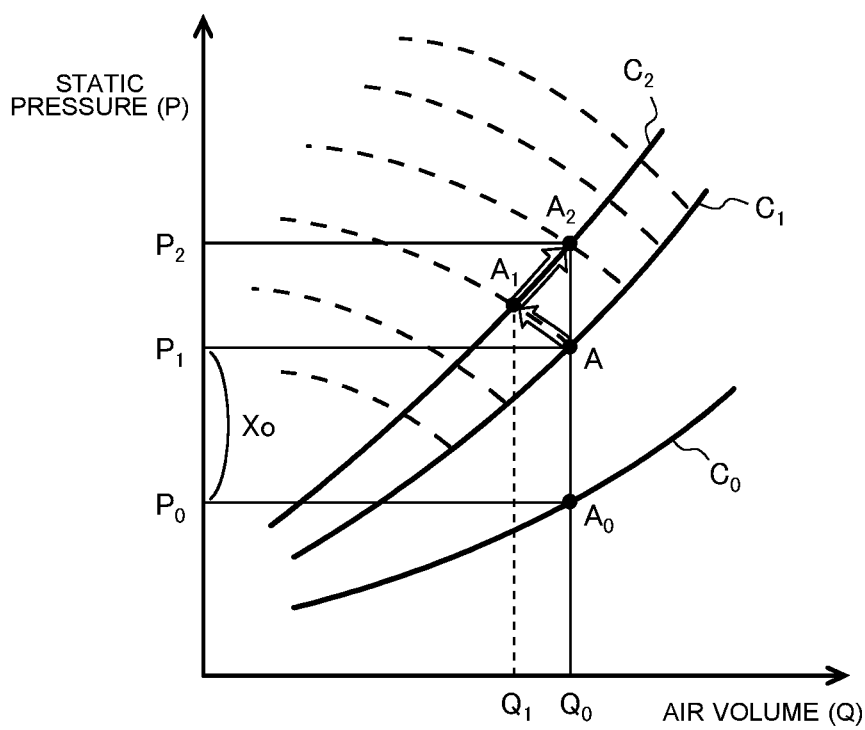
FIG. 7 is an air volume characteristic diagram illustrating the relationship between the static pressure and the air volume of a fan of FIG. 1.

FIG. 7 is an air volume characteristic diagram illustrating the relationship between the static pressure and the air volume of the fan of FIG. 1. In FIG. 7, the horizontal axis represents the air volume, and the vertical axis represents the static pressure. The air volume as used herein means the volume of air sent to an air-conditioned space through the air duct 80. The advantages of the adjustment process of the rotation frequency fin the initial operation, and the advantages of the constant adjustment process of the rotation frequency f will be described, with reference to FIG. 7.

In FIG. 7, $P_0$ is the internal static pressure at the standard point, $P_1$ is the static pressure at the standard point, and $Q_0$ is the specification air volume unique to the air-conditioning apparatus 100. A plurality of dashed curves represent equal rotation frequency curves of the respective rotation frequencies of the fan 10, that is, the respective rotation frequencies f of the motor 10a. A curve $C_0$ represents the internal static pressure curve. The internal static pressure curve $C_0$ is a curve when there is no resistance outside and the external static pressure is 0, and is unique to each fan 10. A point $A_0$ ($Q_0$, $P_2$) represents the air volume from the fan 10 in the case where there is no resistor such as the air duct 80 outside, and the static pressure inside the fan 10 corresponding to that air volume.

Curves $C_1$ and $C_2$ represent examples of static pressure curves. There are different static pressure curves for different conditions of installation on site including the length of the air duct 80. Herein, for convenience of explanation, the static pressure curve $C_1$ is defined to correspond to the case where the air duct 80 has a length of 10 [m], and the static pressure curve $C_2$ is defined to correspond to the case where the air duct 80 has a length of 15 [m]. If the air duct 80 with a length of 10 [m] is attached to the fan 10, the static pressure changes from $P_0$ to $P_1$, and the air volume and the static pressure in this case are represented by the point A. A static pressure $P_1$ is a static pressure obtained by adding an external static pressure X caused by provision of the air duct 80 to the internal static pressure of the fan 10. Accordingly, a standard external static pressure Xo representing the external static pressure X at the standard point is obtained by subtracting the internal static pressure $P_0$ from the static pressure $P_1$ (Xo=$P_1$−$P_0$).

If the air duct 80 with a length of 15 [m] is attached to the fan 10 in the state described above as a reference state, the air volume and the static pressure move from the point A to a point $A_1$ along the equal rotation frequency curve. In this manner, if the air volume and the static pressure move from the point A to the point $A_1$ because of variation in duct work on site or clogging of the filter 10c resulting from an increase in the accumulated time of use of the filter 10c, the air volume decreases from $Q_0$ to $Q_1$. To maintain the specification air volume $Q_0$ of the air-conditioning apparatus 100, the air volume and the static pressure need to be moved from the point $A_1$ to a point $A_2$ ($Q_0$, $P_2$).

The air-conditioning apparatus 100 is configured to increase the rotation frequency f if the motor current I decreases, by utilizing the characteristic that the motor current I decreases as the external static pressure X increases (see, for example NO in, step S112 and S114). Therefore, even in the case described above, it is possible to move the air volume and the static pressure from the point $A_1$ to the point $A_2$, and maintain the specification air volume $Q_0$ of the air-conditioning apparatus 100. Further, even in the case where the length of the air duct 80 is reduced, the air-conditioning apparatus 100 is configured to reduce the rotation frequency f if the motor current I increases, by utilizing the characteristic that the motor current I increases as the external static pressure X decreases (see, for example step YES in S112 and S113). Therefore, it is possible to accurately adjust the air volume and the static pressure, and maintain the specification air volume $Q_0$ of the air-conditioning apparatus 100.

As described above, in the air-conditioning apparatus 100 of Embodiment, a correction process based on the inlet temperature T, which changes as the external static pressure X changes, is performed to the motor current I, so that it is possible to accurately estimate the present external static pressure X, using the corrected control current Ix. Therefore, even when the external static pressure X changes, the rotation frequency of the fan 10 can be accurately adjusted. That is, even when the air duct 80 having a length different from the reference length, the air-conditioning apparatus 100 can automatically adjust the rotation frequency f, in the initial operation upon the installation. Further, even when the airflow resistance is changed because of clogging of the filter 10c or other factors, the air-conditioning apparatus 100 can regularly perform automatic adjustment of the rotation frequency f. Accordingly, even when the external static pressure X changes, the air-conditioning apparatus 100 can supply an appropriate volume of air corresponding to the load to the air-conditioned space.

Note that in the correction process to the motor current I, the controller 20 may acquire the motor current I a plurality of number of times from the current measurement unit 40, and obtain the average motor current Ia, which is the average value of the acquired plurality of motor currents I. Then, the controller 20 may obtain the control current Ix by correcting the average motor current Ia. In this manner, it is possible to avoid using alone a motor current I possibly having a large error due to variation in current value. Furthermore, even if a motor current I having a large error is measured, it is possible to reduce the error by using the average value of the plurality of motor currents I. Accordingly, the accuracy in estimating the external static pressure X is further increased, so that it is possible to further improve the accuracy in rotation frequency control of the fan 10.

Further, the controller 20 is configured to obtain the control current Ix by multiplying the motor current I or the average motor current Ia by the correction coefficient α, which is obtained by comparing the inlet temperature T with the coefficient data. The correction coefficient α for correcting the motor current I or the average motor current Ia is set on the basis of the correlation between the inlet temperature T and the motor current I. Accordingly, it is possible to accurately correct the motor current I or the average motor current Ia by using the correction coefficient α, so that the external static pressure X can be more accurately estimated.

Further, the controller 20 obtains the determination reference by comparing the external static pressure X obtained accurately as described above with the reference data 25c. Therefore, the controller 20 can accurately control the operation of the fan 10, on the basis of the relationship between the determination reference and the control current Ix. The determination reference is, for example, set to a range from a lower limit value to an upper limit value of the current value. In this case, the controller 20 increases the rotation frequency f if the control current Ix is less than the lower limit value of the determination reference, and reduces the rotation frequency f if the control current Ix is greater than the upper limit value of the determination reference. In this manner, it is possible to accurately determine whether the rotation frequency f needs to be adjusted, by comparing the control current Ix corrected on the basis of the inlet temperature T with the reliable external static pressure X, so that the control stability and reliability can be improved.

For example, the controller 20 may be configured to increase the rotation frequency f by the lower limit set amount if the control current Ix is less than the lower limit value of the determination reference, and reduce the rotation frequency f by the upper limit set value if the control current Ix is greater than the upper limit value of the determination reference. In this case, the adjustment process of the rotation frequency f described above is preferably performed repeatedly until the control current Ix falls within the determination reference. In this manner, even when the control current Ix is outside the determination reference and the difference between the control current Ix and the lower limit value or the upper limit value is relatively large, the control current Ix can be brought within the determination reference by reducing or increasing the rotation frequency f in a stepwise manner. Further, when the control current Ix is outside the determination reference and the difference between the control current Ix and the lower limit value or the upper limit value is relatively small, the control current Ix can be brought within the determination reference by a simple operation.

If the control current Ix is less than the lower limit value of the determination reference, the controller 20 may obtain a lower limit difference representing the difference between the control current Ix and the lower limit value, and increase the rotation frequency f depending on the magnitude of the lower limit difference. Similarly, if the control current Ix is greater than the upper limit value of the determination reference, the controller 20 may obtain an upper limit difference representing the difference between the control current Ix and the upper limit value, and reduce the rotation frequency f depending on the magnitude of the upper limit difference. In this manner, the control current Ix can be relatively quickly brought within the determination reference, and the number of times the rotation frequency f is adjusted can be reduced.

In the above Embodiment, preferred examples of an air-conditioning apparatus have been described. However, the technical scope of the present disclosure is not limited to these examples. For example, for purposes of convenience, the above operations in the flowcharts have been described in the order of step numbers shown in FIGS. 5 and 6. However, the operations are not limited to these examples. For example, even when the order of some steps in FIGS. 5 and 6 is changed, it is possible to accurately estimate the external static pressure X, and improve the adjustment accuracy of the rotation frequency f.

Further, the coefficient data 25a may include a reference temperature that is set in advance and that can be appropriately changed, in place of the reference temperature range. In this case, the correction coefficient α for the reference temperature is set to "1". The inlet temperature T lower than the reference temperature is associated with a correction coefficient α having a value less than 1, whereas the inlet temperature T higher than the reference temperature is associated with a correction coefficient α having a value greater than 1. When the inlet temperature T is lower than the reference temperature, the correction coefficient α decreases as the difference between the inlet temperature T and the reference temperature increases. When the inlet temperature T is higher than the reference temperature, the correction coefficient α increases as the difference between the inlet temperature T and the reference temperature increases. However, to achieve stable control while avoiding a situation in which the operation of increasing the rotation frequency f and the operation of reducing the rotation frequency f are frequently performed, it is preferable to set a reference temperature range of a predetermined range in place of a reference temperature representing a threshold value.

Further, in the above Embodiment, the control current Ix is obtained by multiplying the motor current I or the average motor current Ia by the correction coefficient α. However, how the control current Ix is obtained is not limited to this case. For example, the coefficient data 25a may be data associating the inlet temperature T and a correction coefficient β to be added to the motor current I or the average motor current Ia for obtaining the control current Ix. In this case, the correction coefficient β for the reference temperature range in the coefficient data 25a is set to "0". Further, in the coefficient data 25a, the inlet temperature T lower than the upper limit temperature is associated with a correction coefficient β having a value less than 0, that is, a negative value, whereas the inlet temperature T higher than the lower limit temperature is associated with a correction coefficient β having a value greater than 0. The same applies when a reference temperature is set in place of a reference temperature range in the coefficient data 25a.

Further, in the above Embodiment, the determination reference is a range of the current value from a lower limit value to an upper limit value. However, the determination reference is not limited to this case. The determination reference may be a current value representing a threshold value. However, from the viewpoint of control stability, the determination reference is preferably a range of the current value.

The invention claimed is:

1. An air-conditioning apparatus comprising:
a fan including a motor and configured to send air to an air-conditioned space through a duct;
a current measurement unit configured to measure a value of a current applied to the motor as a motor current;
an inlet temperature measurement unit configured to measure a temperature of air flowing into the duct as an inlet temperature; and
a controller configured to control the fan,
the controller
storing current characteristic data associating the motor current and a rotation frequency of the motor with an external static pressure,
being configured to perform a correction process based on the inlet temperature to the motor current to obtain a control current,
being configured to estimate the external static pressure, by comparing the control current obtained by the controller and the rotation frequency of the motor with the current characteristic data, and
being configured to control a rotation frequency of the fan, based on the external static pressure estimated by the controller,
in the correction process to the motor current, the controller being configured to acquire the motor current from the current measurement unit a plurality of number of times, obtain an average motor current representing an average value of a plurality of the acquired motor currents, and obtain the control current by correcting the obtained average motor current.

2. The air-conditioning apparatus of claim 1,
wherein the controller stores coefficient data associating the inlet temperature with a correction coefficient, and
wherein the controller is configured to obtain the correction coefficient by comparing the inlet temperature with the coefficient data, and obtain the control current by multiplying the average motor current by the obtained correction coefficient.

3. An air-conditioning apparatus comprising:
a fan including a motor and configured to send air to an air-conditioned space through a duct;
a current measurement unit configured to measure a value of a current applied to the motor as a motor current;
an inlet temperature measurement unit configured to measure a temperature of air flowing into the duct as an inlet temperature; and
a controller configured to control the fan,
the controller storing current characteristic data associating the motor current and a rotation frequency of the motor with an external static pressure and coefficient data associating the inlet temperature with a correction coefficient,
being configured to perform a correction process based on the inlet temperature to the motor current to obtain a control current,
being configured to estimate the external static pressure, by comparing the control current obtained by the controller and the rotation frequency of the motor with the current characteristic data,
being configured to control a rotation frequency of the fan, based on the external static pressure estimated by the controller, and
being configured to obtain the correction coefficient by comparing the inlet temperature with the coefficient data, and obtain the control current by multiplying the motor current by the obtained correction coefficient.

4. An air-conditioning apparatus comprising:
a fan including a motor and configured to send air to an air-conditioned space through a duct;
a current measurement unit configured to measure a value of a current applied to the motor as a motor current;
an inlet temperature measurement unit configured to measure a temperature of air flowing into the duct as an inlet temperature; and
a controller configured to control the fan,
the controller storing current characteristic data associating the motor current and a rotation frequency of the motor with an external static pressure,
being configured to perform a correction process based on the inlet temperature to the motor current to obtain a control current,
being configured to estimate the external static pressure, by comparing the control current obtained by the controller and the rotation frequency of the motor with the current characteristic data,
being configured to control a rotation frequency of the fan, based on the external static pressure estimated by the controller,
further storing reference data associating the external static pressure with a determination reference used to determine whether to adjust the rotation frequency of the motor,
being configured to obtain the determination reference by comparing the external static pressure estimated by the controller with the reference data, and
being configured to control the rotation frequency of the fan, based on a relationship between the determination reference and the control current.

5. The air-conditioning apparatus of claim 4,
wherein the determination reference is set to a range from a lower limit value to an upper limit value, and
wherein the controller is configured to,
when the control current is less than the lower limit value of the determination reference, increase the rotation frequency of the motor, and
when the control current is greater than the upper limit value of the determination reference, reduce the rotation frequency of the motor.

6. The air-conditioning apparatus of claim 5, wherein the controller is configured to,
when the control current is less than the lower limit value of the determination reference, increase the rotation frequency of the motor by a lower limit set amount, and when the control current is greater than the upper limit value of the determination reference, reduce the rotation frequency of the motor by an upper limit set amount.

7. The air-conditioning apparatus of claim 5, wherein the controller is configured to, when the control current is less than the lower limit value of the determination reference, obtain a lower limit difference representing a difference between the control current and the lower limit value, and increase the rotation frequency of the motor depending on a magnitude of the lower limit difference, and when the control current is greater than the upper limit value of the determination reference, obtain an upper limit difference representing a difference between the control current and the upper limit value, and reduce the rotation frequency of the motor depending on a magnitude of the upper limit difference.

\* \* \* \* \*